(No Model.)
E. L. S. OSBORN.
KEY BOARD ATTACHMENT FOR PIANOS.
No. 397,815. Patented Feb. 12, 1889.
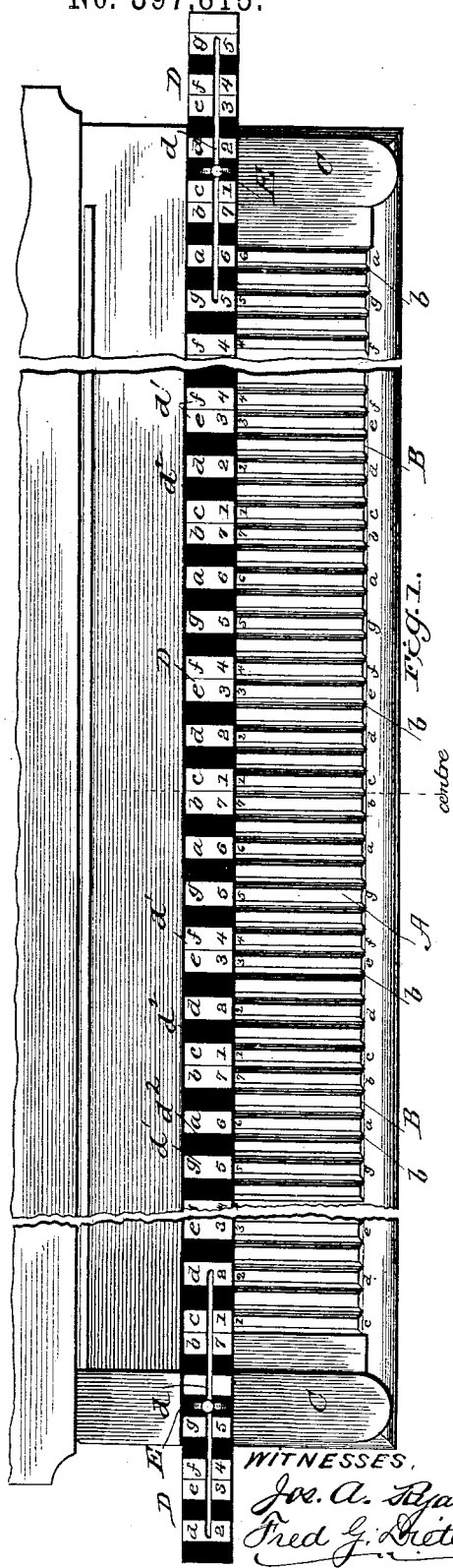
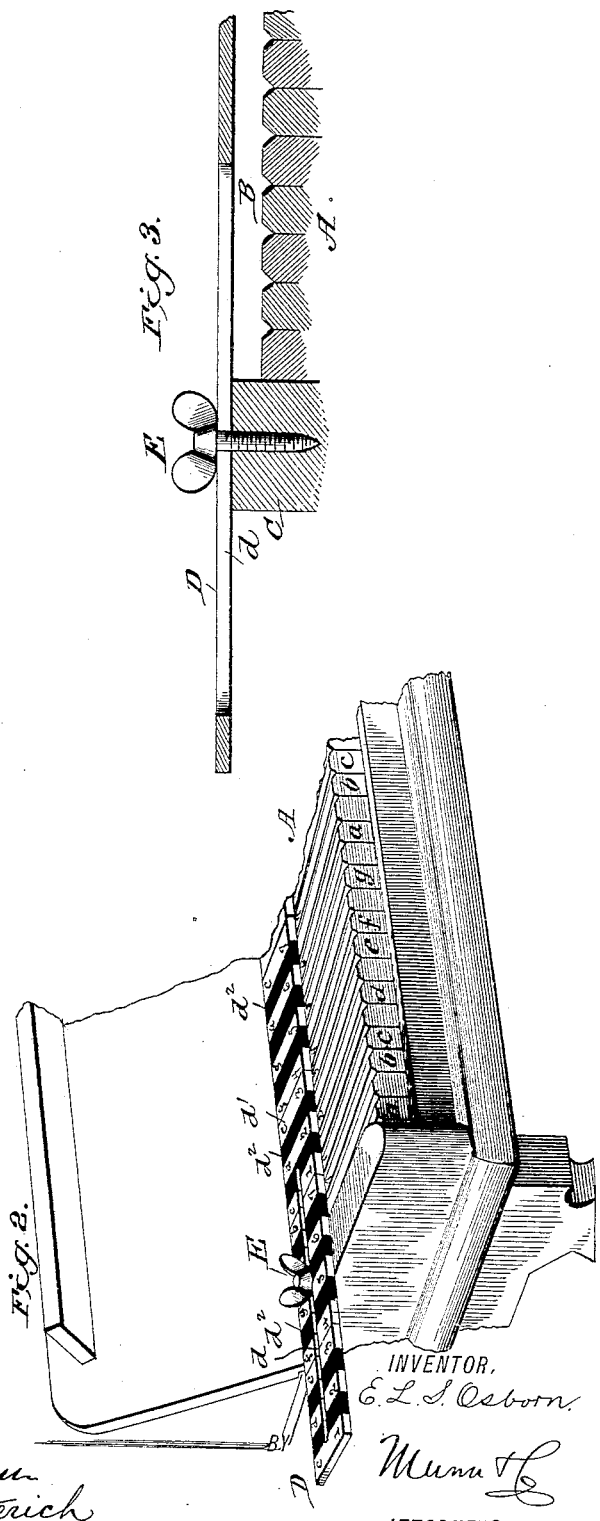

UNITED STATES PATENT OFFICE.

ENOCH L. S. OSBORN, OF WAXAHACHIE, TEXAS, ASSIGNOR OF TWO-THIRDS TO DAVID MONROE NEUMAN, OF SAME PLACE.

KEY-BOARD ATTACHMENT FOR PIANOS.

SPECIFICATION forming part of Letters Patent No. 397,815, dated February 12, 1889.

Application filed August 3, 1888. Serial No. 281,860. (No model.)

*To all whom it may concern:*

Be it known that I, ENOCH LIVESAY SOLOMON OSBORN, residing at Waxahachie, in the county of Ellis and State of Texas, have invented new and useful Improvements in Combined Key-Board and Attachment for Pianos, Organs, &c., of which the following is a specification.

My invention relates to key-boards of pianos, organs, &c., and has for its object to simplify the reading of music for instruments with that for the voice, thereby making the character-notes for the voice also become the character-notes of the instrument, and thus avoid the labor, time, trouble, difficulty, and expense of teaching and learning the two ways of reading music, (by the lines and spaces of the music-staffs,) and thereby facilitate and improve the art and science of music.

My invention consists in constructing a key-board of uniform keys, all of the same form, size, and color, thirteen in the first octave and twelve in the succeeding octaves, and they are made of a width of seven-twelfths the size of the ordinary white keys of pianos.

It also consists in providing the key-board with a sliding attachment arranged above the keys, adapted to lengthwise adjustment in relation to the keys. This attachment is formed with stripes of different colors—usually white and black—which are so applied as to present a representation of the usual white and black key-board of pianos. The keys are also provided with a certain arrangement of numerals and letters to form guides for the adjustment of the sliding attachment, whereby the chromatic scale of the instrument is transposed with the key and the notes of the voice, so that the reading for the voice and for the instrument are the same in all cases; and it further consists in the peculiar combination and arrangement of parts, as will be fully described, and particularly pointed out in the claims, reference being had to the accompanying drawings, in which—

Figure 1 is a plan view of my improvement as applied to so much of a piano as is necessary to illustrate the invention. Fig. 2 is a detail perspective view of the same; and Fig. 3 is a detail section, hereinafter referred to.

In the practical construction of my invention the key-board A is formed with the usual number of keys B to form the requisite number of octaves. The keys B are all of the same form, size, length, and color, (usually white,) and are provided with beveled or slanted edges $b$, so much so that the upper face of each key is not more than one-half the width of the key proper. These keys are divided into octaves comprising thirteen in the first octave and twelve in the next succeeding octaves, and are of seven-twelfths the width of the ordinary white key of pianos, so that the breadth or compass of each octave will be the same as that of the usual key-board. Upon the front edges of such of the keys B as would correspond to the white keys of the ordinary key-board are indicated letters a, b, c, d, e, f, and g, and near their inner edges are indicated the numerals 6 7 1 2 3 4 5, the remaining keys, which correspond to the black keys of the usual key-board, being left entirely plain.

Mounted upon the end terraces, C, of the piano-frame, at the inner ends of the key-board A and slightly above the rear edges of the keys B, is a movable chromatic scale-plate, D, made of any suitable material—such as wood, tin, &c.—of suitable width (usually one and one-half to four inches) and about one-half of an inch or less thick and of a length at least one octave greater than the key-board A. The scale D is adapted to slide lengthwise, and for proper adjustment of such scale-plate in any desired position in relation with the key-board it is provided at its ends with elongated slots $d$ at least one octave long, through which slots passes a thumb-screw, E, which enters the terrace C or other projection to which the scale-plate may be attached, and thereby secures the same in position.

By reference to the drawings it will be observed that the scale-plate D is disposed almost horizontally above the keys, and the upper face and the front edge thereof are divided into stripes $d'$ $d^2$ of different colors—usually white and black—drawn across the width and front edge of said scale-plate. These stripes are made of a similar width to the keys B, and are so arranged as to be brought in the same alignment with them. The stripes $d'$ $d^2$ are so arranged upon the plate D as to present an exact representation of the ordinary key-board of a piano, the stripes $d'$ representing the white keys, and $d^2$ the black keys. Upon the front edges of the white stripes $d'$ of the scale-plate D are indicated numerals 6 7 1 2 3 4 5, while upon the rear edges are indicated the letters a b c d e f g.

Thus by the arrangement of the keys in connection with the movable scale-plate D it will be observed that when the music is of the major key natural—that is, major key of C—by sliding the scale so that the middle white stripe c 1 will be in alignment with the middle c 1 on the key-board, and by reading the notes and calling them "do, re, mi, fa, sol, la, si, do," as one would sing them, and correspondingly touch the keys opposite the white stripes, on which the corresponding numerals and letters are placed, the character-notes of the voice become the character-notes of the instrument.

Should the music be of the key of g, f, or any other letter, natural, sharp, or flat, move the scale-plate to the right or left to bring c and 1 of the scale-plate in alignment with such letter of the key-board, and then play as before, reading the music in connection with scale on the plate D according to the numerals thereon.

When the music is of a minor key, move a 6 of the movable scale up to the proper key. For an accidental sharp or flat, touch the key opposite the proper black stripe.

From the foregoing description, taken in connection with the drawings, the operation and advantages of my improvement will be readily understood.

Thus by this arrangement the chromatic scale of the instrument is transposed with the key-note and the notes of the voice, so that the reading for the voice and for the instrument is always the same, and the performance on the instrument always as by the natural scale, so that the natural scale only has to be learned, whereas by the old key-board method twelve different scales have to be learned, (by lines and spaces of the staffs,) and in all cases one reading for the voice and an entirely different one for the instrument. It will also be seen that while in the old key-board the keys are of different heights and lengths, it renders the proper use of them extremely difficult, while by my arrangement of the key-board the keys are uniform in every way. By forming them with the slanted or beveled edges the handling of the same will be easy, and in touching one key the finger will not be liable to touch or press another down at the same time, as their operating-faces are separated by the beveled portions, as described.

With a slight modification of parts of the ordinary key-board my construction of key and the movable scale-plate may be readily applied.

Having thus described my invention, what I claim is—

1. The combination, with the key-board A, provided with a series of keys of uniform shape and size provided with numerals or letters on their faces, the upper ends thereof being in the same horizontal plane, of the movable plate D, arranged at the rear and above the key-board, said plate provided with stripes of different colors (preferably white and black) representing the chromatic scale, one of said stripes (white) provided with numerals or letters adapted to be brought in line with the numerals or letters on the keys, said stripes and keys being of equal width, substantially as and for the purpose described.

2. The combination, with the key-board A, provided with a series of keys of uniform shape and size, having numerals and letters placed upon the faces of said keys at intervals to indicate their position in the octaves, of the movable plate D, arranged at the rear and slightly above the key-board, said plate provided with elongated slots in its ends and thumb-screws, whereby said scale-plate may be adjusted upon the frame of the instrument, said plate provided with stripes of different colors (preferably white and black) upon its upper face, said stripes arranged to represent the chromatic scale, one set of said stripes (white) provided with numerals and figures, said stripes formed of a width equal to the keys B, all arranged substantially as and for the purposes described.

ENOCH L. S. OSBORN.

Witnesses:
JAS. P. GOTCHER,
DAVID M. NEUMAN.